US006206326B1

(12) United States Patent
Stanek et al.

(10) Patent No.: US 6,206,326 B1
(45) Date of Patent: Mar. 27, 2001

(54) METHOD AND APPARATUS FOR ACTIVELY ENHANCING AIRCRAFT WEAPON SEPARATION

(75) Inventors: Michael J. Stanek, Springboro; Rodney L. Clark, Centerville, both of OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/289,867

(22) Filed: Apr. 12, 1999

(51) Int. Cl.[7] .......................................... B64D 1/02
(52) U.S. Cl. ................. 244/137.4; 244/130; 244/118.1
(58) Field of Search .................... 244/207, 130, 244/118.1, 137.1, 137.4; 89/1.54

(56) References Cited

U.S. PATENT DOCUMENTS

| | | | |
|---|---|---|---|
| 2,749,064 | * | 6/1956 | Kuhlman, Jr. ................ 244/137.1 |
| 2,954,949 | * | 10/1960 | Smith et al. ................ 244/137.1 |
| 3,018,691 | * | 1/1962 | Merkin ...................... 244/137.4 |
| 3,216,455 | * | 11/1965 | Cornell et al. ............... 244/130 |
| 4,863,118 | | 9/1989 | Stallings, Jr. et al. . |
| 5,018,688 | | 5/1991 | Stallings, Jr. et al. . |

OTHER PUBLICATIONS

Vakili et al., Control of Cavity Flow by Upstream Mass Injection, AIAA Paper No. 91–1645, Jun. 1991.
Vakili et al., Active Control of Cavity Aeroacoustics in High Speed Flows, AIAA Paper No. 95–0678, Jan. 1995.

* cited by examiner

Primary Examiner—Galen L. Barefoot
(74) Attorney, Agent, or Firm—Richard A. Lambert; Bobby D. Scearce; Thomas L. Kundert

(57) ABSTRACT

A method and apparatus for actively enhancing aircraft weapon separation by actively modifying the flowfield characteristics of an open, shallow weapons bay during flight is disclosed. The apparatus includes a source of high pressure gas in fluid communication with an injector located on the aircraft. A control valve controls the introduction of a flow of high pressure gas from the source into the injector. The injector is placed ahead of the nose of the weapon and directs the flow of the high pressure gas externally into the airstream of the aircraft in flight. The injection of the high pressure gas into the airstream initiates a flowfield in the open weapons bay similar to that which occurs in a deep bay, encouraging a flat, even weapons separation.

24 Claims, 5 Drawing Sheets

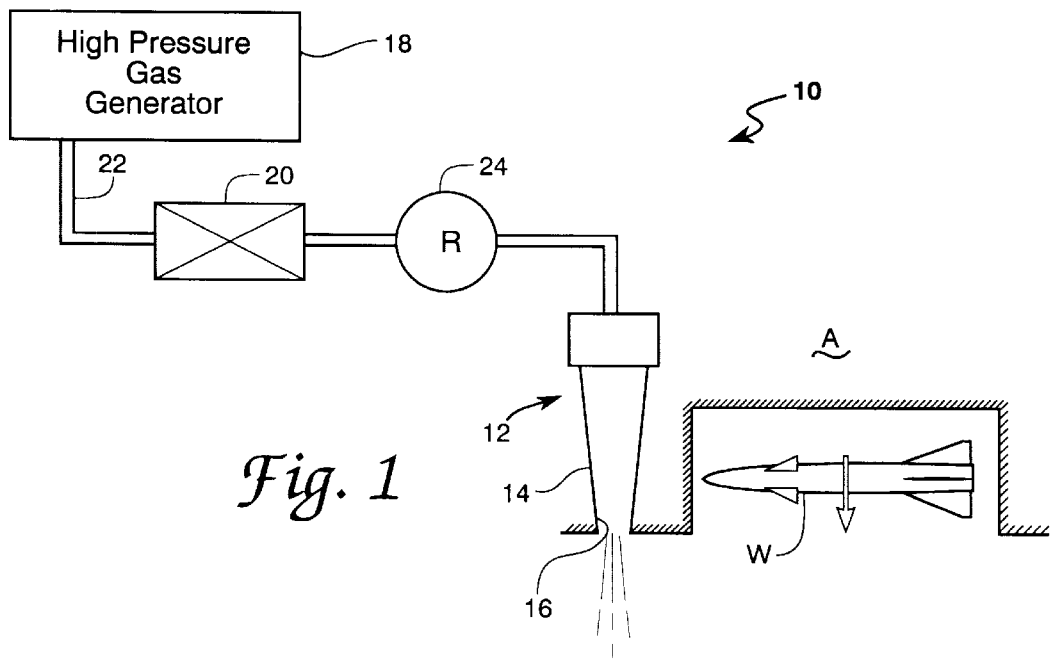
*Fig. 1*
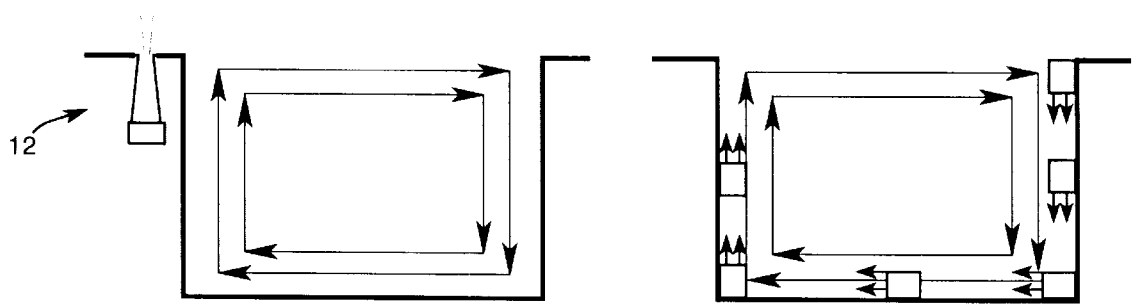
*Fig. 3*     *Fig. 7*

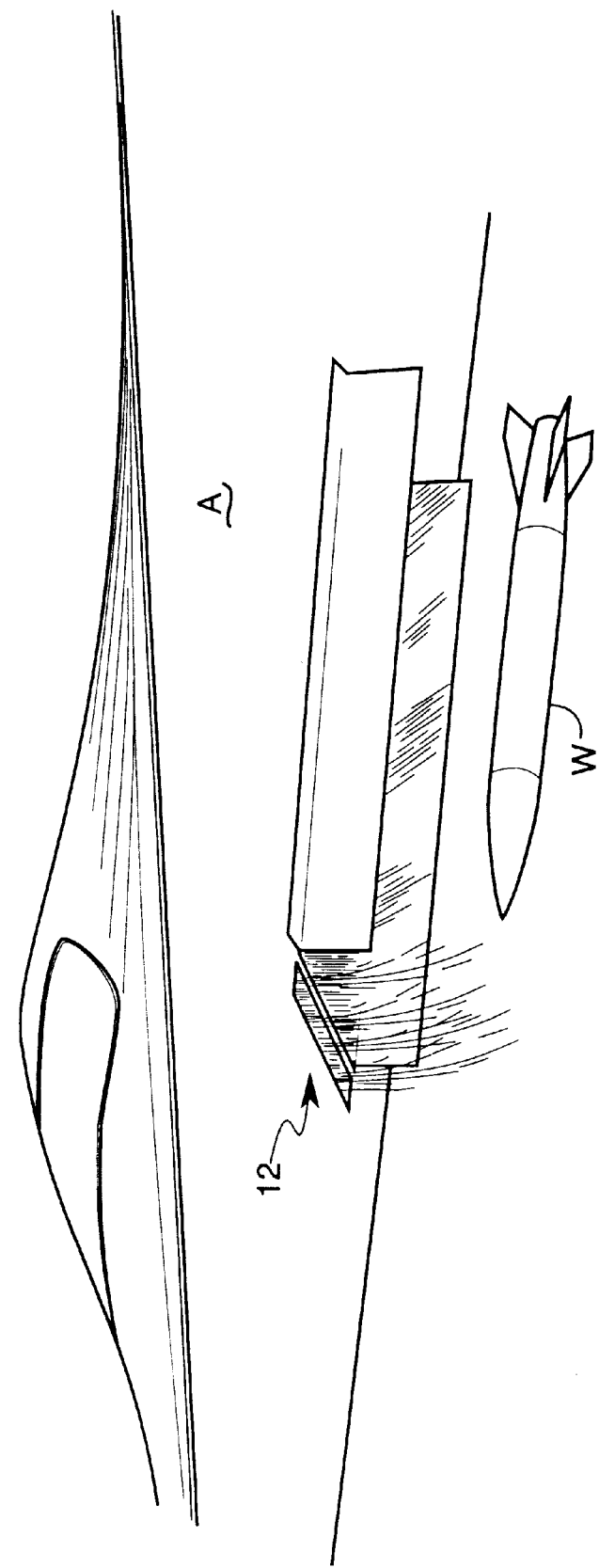

100
METHOD AND APPARATUS FOR ACTIVELY ENHANCING AIRCRAFT WEAPON SEPARATION

RIGHTS OF THE GOVERNMENT

The invention described herein may be manufactured and used by or for the Government of the United States for all governmental purposes without the payment of any royalty.

BACKGROUND OF THE INVENTION

The present invention relates generally to aircraft weapons stores, and more particularly, to an apparatus and method for enhancing aircraft weapons separation from an open weapons bay during flight.

Depending on configuration and application, military aircraft will sometimes carry weapons to be discharged during flight within one or more cavities, commonly known as weapons bays. The weapons bays usually include a pair of doors which are opened only when release of the weapon stores is anticipated. During the remainder of the aircraft flight, the weapons bay doors are closed, presenting a smooth surface to enhance aerodynamic performance as well as other characteristics, such as stealthiness, for example.

While carrying weapons or stores in a normally closed weapons bay has many advantages, a known disadvantage is that the bay can negatively influence weapons release. Indeed, depending on aircraft configuration and speed, the weapon might actually pitch up and fly back toward the aircraft after release. The physical dimensions of the weapons bay are a primary contributor to this problem. More specifically, it is known that shallow bays or cavities, generally defined as having a length to height ratio of 10 or more, are far more likely to induce this type of undesirable weapons release behavior than deep bays or cavities, which are generally defined as having a length to height ratio of 4 or less. This is because the flowfield occurring in the shallow bay when opened produces a strong back to front pressure gradient within the cavity. This pressure gradient tends to push the tail of the weapon out into the airstream and may simultaneously tend to pull the nose of the weapon up towards the aircraft. Conversely, the pressure gradient produced on the ceiling of the deep bay, is characterized by a low gradient pressure profile. This is an advantage because the low pressure gradient profile tends to keep the weapon from pitching. This encourages a flatter, more even weapon separation. As weapons decrease in size, the undesirable effects of the weapons bay flowfield are magnified. Since a trend in weapons development is to make weapons stores much smaller, this problem is growing.

One way of alleviating the weapons separation problem associated with weapons bay configuration would be to convert a shallow weapons bay to a deep bay by physically altering its dimensions. While this method can perhaps be utilized on some aircraft, the dimensions of the weapons bay are usually determined in part by the size and shape of the aircraft and as a result often can't be altered to the extent necessary to effect the desired change. Further, there are competing considerations to be taken into account when considering this approach. More specifically, while deep bays, by their nature, tend to enhance weapons separation, they also display high levels of damaging acoustic resonance which causes high pressure, high frequency fluctuating acoustic loads. This acoustic resonance can be strong enough to damage the aircraft or its systems. Thus, converting a shallow bay to a deep bay in order to enhance weapons separation may result in a disadvantageous increase in damage to the aircraft itself.

Another solution is perhaps found by ejecting the weapon out of the weapons bay more vigorously. This could be accomplished, for example, by increasing weapons ejector force while increasing the nose down pitching moment of the weapon. This is oftentimes undesirable because imparting higher ejection forces would necessitate a stronger aircraft and weapon structure, increasing weight, cost and complexity. Moreover, this could result in undesirable weapons launch effects such as loss of control of a guided weapon and loss of boresight correlation with the resulting loss of a target lock-on, as the weapon is forcibly ejected.

Other attempts to reduce the undesirable shallow weapons bay separation characteristics are found, for example, in U.S. Pat. Nos. 4,863,118 and 5,018,688 both to Stallings Jr. et al. In the '118 patent, hollow pipes are placed on the ceiling of the weapons bay. In the '688 patent, a porous slab is placed adjacent the ceiling of the weapons bay. In each, the apparatus placed on the ceiling was intended to passively induce a flow of air from the back of the weapons bay to the front. These patents both represent an attempt to alleviate the high pressure gradient typically found in shallow weapons bays by passively directing a flow of air from the high pressure area in the back of the bay to the lower pressure area in the front of the bay. While moderately successful, these techniques do not outweigh the increased cost, complexity and weight attendant with their incorporation into an aircraft.

Yet another attempt is found by the placement of a spoiler at the forward edge of the weapons bay. While spoilers have some positive effect on weapons separation, a disadvantage is that spoilers often don't provide enough of the desirable nose down pitching moment for some weapon and aircraft combinations and thus are sometimes inadequate to effect the desired weapons separation.

A need exists therefore for an improved method and apparatus for actively enhancing aircraft weapon separation from an open aircraft weapons bay.

It is therefore a primary object of the present invention to provide a method and apparatus for actively enhancing aircraft weapon separation overcoming the limitations and disadvantages of the prior art.

It is another object of the present invention to provide a method and apparatus for actively enhancing aircraft weapon separation rendering assured weapons release during flight.

It is another object of the present invention to provide a method and apparatus for actively enhancing aircraft weapon separation which can be readily incorporated into existing aircraft structures.

It is still another object of the present invention to provide a method and apparatus for actively enhancing aircraft weapon separation which can be utilized on a wide variety of aircraft and weaponry.

These and other objects of the invention will become apparent as the description of the representative embodiments proceeds.

SUMMARY OF THE INVENTION

In accordance with the foregoing principles and objects of the invention, a method for enhancing aircraft weapons separation by actively modifying the flowfield characteristics of an open weapons bay during flight is described. The method includes providing an injector ahead of the nose of the weapon for introducing a flow of high pressure gas into the airstream surrounding the aircraft in flight. In the preferred embodiment, the injector is a convergent slot placed in front of the weapons bay, extending across its entire width.

The high pressure gas is generated by a one or more chemical reaction type gas generators. The gas pressure thus generated is regulated through a pressure regulator and then directed into the injector which forces it into the external airstream. Chemical reaction gas generators are well known and provide a reliable source of high pressure gas while not adding appreciable weight. Moreover they are compact and as a result can be easily incorporated into an existing aircraft.

Advantageously, the injection of high pressure gas into the airstream initiates a flowfield in the open, shallow weapons bay very similar to that which occurs in a deep bay. A low pressure gradient profile from the back of the bay to the front is observed and this low pressure gradient profile tends to keep the weapon from pitching after release. This encourages a flatter, more even weapon separation.

As can be seen, the method of the present invention facilitates the use of shallow weapons bays in aircraft by taking advantage of their reduced instance of damaging acoustic resonances while simultaneously exhibiting the enhanced weapon separation characteristics of a deep weapons bay. The apparatus of the present invention requires few parts, takes up little space and can be readily incorporated into many different aircraft.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 1 is a schematic view of the invention;

FIG. 2 is a perspective view of an aircraft shown releasing a weapon in conjunction with operation of the present invention;

FIG. 3 is a diagrammatic cross section of a weapons bay showing the flowfield created by operation of the present invention;

FIG. 4b. is a graph illustrating the pressure gradient created on the ceiling of the weapons bay illustrated in FIG. 4a;

FIG. 7 is a diagrammatic cross section of a weapons bay showing the flowfield created by operation of an alternative embodiment of the present invention; and, FIG. 8 is a perspective view of an aircraft shown releasing a weapon in conjunction with operation of an alternative embodiment of the present invention.

DETAILED DESCRIPTION OF THE INVENTION

Figure 4A:
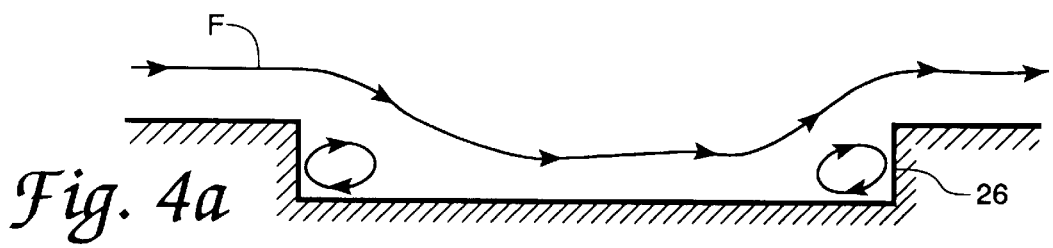
FIG. 4a is a diagrammatic cross section of a shallow weapons bay showing the flowfield created in and near the bay by the aircraft in flight.

Reference is made to the drawing figures showing the method and apparatus for actively enhancing aircraft weapons separation of the present invention. FIG. 1 shows the apparatus 10 of the present invention in schematic view. The apparatus 10 includes an injector 12 located within the body of the aircraft. The injector 12 is placed ahead of the nose of the weapon. In the preferred embodiment, the injector 12 includes a convergent section 14. An outlet orifice 16 is provided in the injector 12 and is oriented in a direction external to the aircraft A. Reference is also made to FIG. 2 showing an exemplary placement of the injector 12 on an aircraft A. As shown, the injector 12 preferably extends across the entire width of the weapons bay.

The apparatus 10 includes a gas generator 18 as a source for high pressure gas. The gas generator 18 can include a storage tank, not shown, to retain a volume of high pressure gas for ready expenditure. In the preferred embodiment, the gas generator 18 includes one or more chemical gas generators, such as, for example, of the type used in the automotive art for passenger protection "air bags". Chemical gas generators are well known and come in a wide variety of configurations and operating pressures. Thus, the apparatus 10 of the present invention can be readily modified to be incorporated into a wide variety of aircraft depending on size, speed, weaponry, etc. Depending on variables such as aircraft, weaponry, altitude, speed, etc., the mass flow rate of the high pressure gas is varied. It can range, for example, from about 5 lbm/sec to about 50 lbm/sec or even higher. Likewise, the pressure of the gas is varied depending on operating conditions. It can range up to 5,000 psi or more.

As can be appreciated, and depending on the specific aircraft application, the gas generator 18 can incorporate other types of high pressure sources known to those skilled in the art as well. For example, the gas generator 18 can be a direct connection to a bleed port provided within the high pressure compressor section of the gas turbine engine used to power the aircraft. Alternatively, the gas generator can be a mechanical compressor.

A control valve 20 receives the high pressure gas from the gas generator 18 via a conduit 22. The control valve 20 is utilized to initiate and maintain a flow of high pressure gas into the injector 12. More specifically, the control valve 20 would generally be opened upon the initiation of the weapon separation sequence and remain open until the weapon is clear of the aircraft. This is usually accomplished within 0.5 seconds. As can be appreciated, the operation of the control valve 20 thus controllably provides the desired continuous flow of high pressure gas for the time necessary for weapons release. The control valve 20 would then be shut off in order to conserve the expenditure of the high pressure gas.

Depending on the specific application, the control valve 20 may be placed in outlet fluid communication with a pressure regulator 24. The pressure regulator 24 is utilized to reduce the pressure of the gas (if necessary) to the desired level prior to introduction into the injector 12.

Figure 4B:
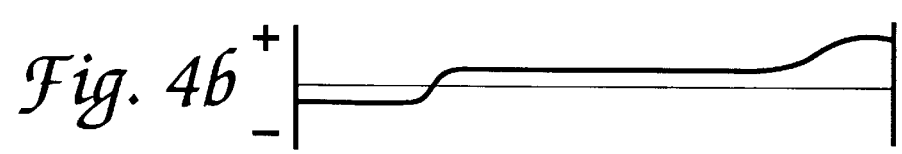

Turning now to FIGS. 4a–4d, an effect of utilization of the invention will now be described. In FIG. 4a, the flowfield F occurring in a shallow weapons bay 26 is illustrated. FIG. 4b is a corresponding graph of the typical pressure distribution seen in the shallow weapons bay 26 of FIG. 4a which results from the flowfield. As can be seen, the pressure is high at the rear of the bay 26 and actually becomes negative at the front. This gives rise to the problematic weapons release behavior described above. More specifically, the high pressure at the rear of the weapons bay 26 causes the back of the weapon (not shown) to be forcibly ejected. The negative pressure at the front of the bay 26 causes the nose of the weapon to be pulled back into the bay 26. Obviously, this condition is undesirable for weapons release.

Figure 4C:
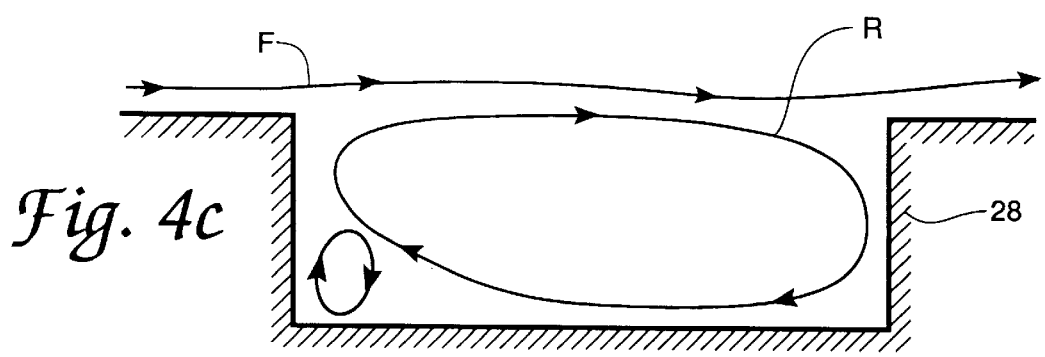
FIG. 4c is a diagrammatic cross section of a deep weapons bay showing the flowfield created by the aircraft in flight.
Figure 4D:
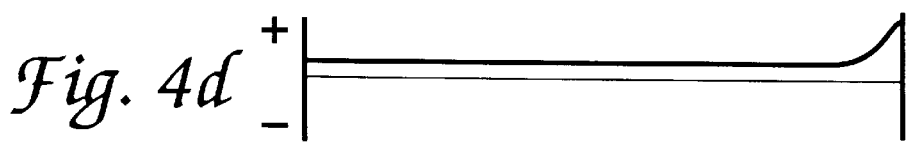
FIG. 4d is a graph illustrating the pressure gradient created on the ceiling of the weapons bay illustrated in FIG. 4c.

In FIG. 4c, the flowfield F occurring in a deep weapons bay 28 is illustrated. Like FIG. 4b above, FIG. 4d is a corresponding graph of the typical pressure distribution seen in the deep weapons bay 28. As can be seen, the pressure is generally quite even from back to front of the bay 28. Moreover, a desirable recirculating flow is created within the bay flowfield F. As can be appreciated, the even, positive pressure distribution in conjunction with the recirculating flow tends to urge the weapon outwardly from the aircraft A in an even manner, without any adverse pitching movement.

Utilization of the apparatus 10 and method of the present invention has the effect of converting the flowfield F within a shallow bay 26 into that normally associated with the deep bay 28. Thus, the desirable weapons release qualities of the deep bay 28 can be imparted to the shallow bay 26 while simultaneously avoiding the attendant undesirable acoustic resonances found in deep bays.

Figure 5:
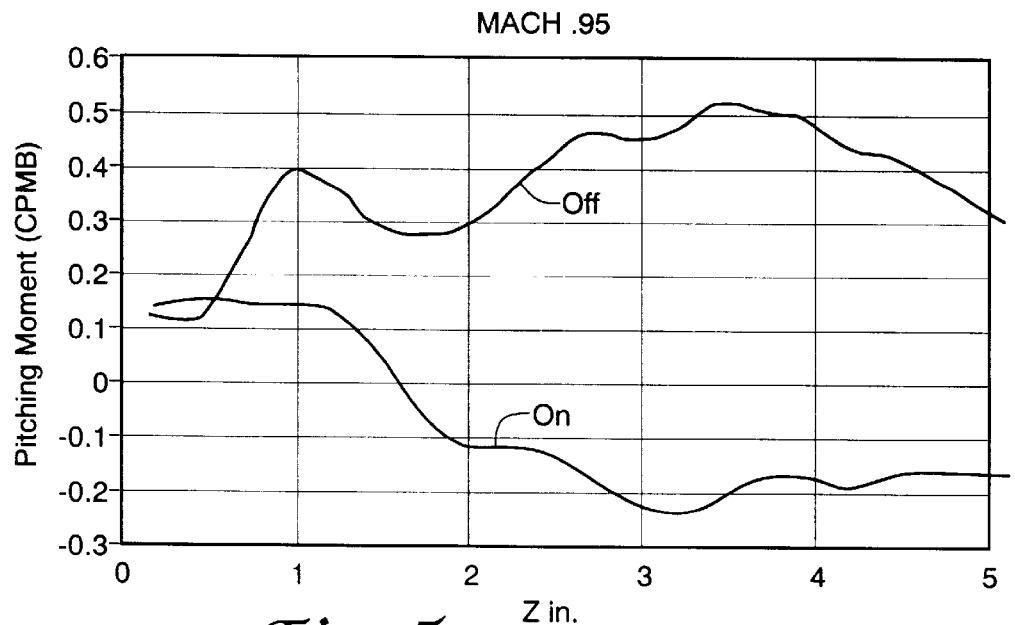
FIG. 5 is a graph illustrating the reduction in weapon pitching moment obtained by utilization of the method of the present invention at a simulated aircraft speed of Mach 0.95.
Figure 6:
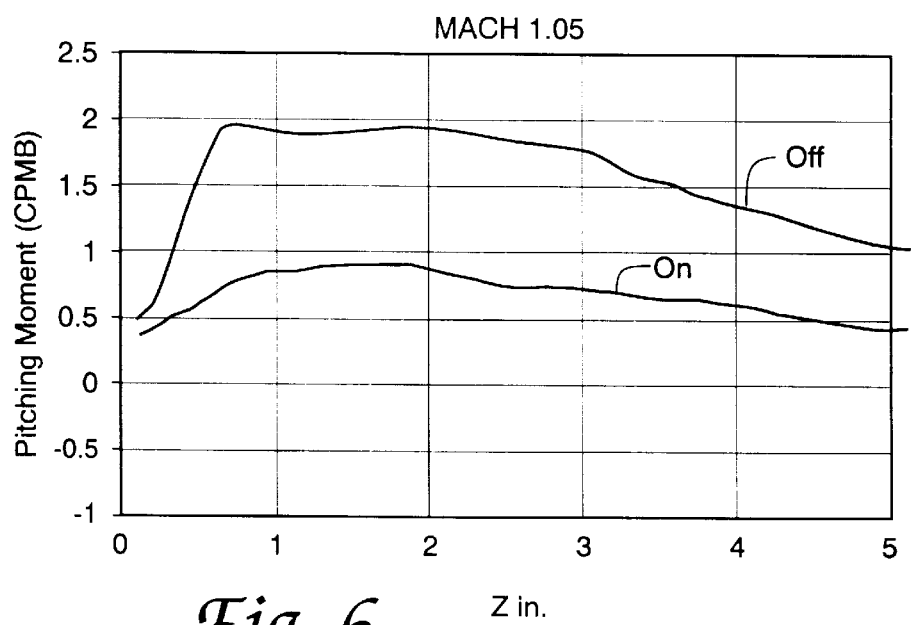
FIG. 6 is a graph illustrating the reduction in weapon pitching moment obtained by utilization of the method of the present invention at a simulated aircraft speed of Mach 1.05.

The advantages resulting from the utilization of the apparatus 10 and method of the present invention have been borne out via laboratory experimentation. Reference is made to FIGS. 5 and 6 wherein the non-dimensional weapons pitching moment relative to the center of gravity of the weapon is graphically illustrated for both the apparatus 10 off and on states. The undesirable pitching moment is clearly shown to have been dramatically reduced in simulated subsonic FIG. 5 and supersonic FIG. 6 flight conditions.

It is understood that certain modifications can be made to the apparatus 10 without departing from the spirit and scope of the present invention. For example, reference is directed to FIG. 7. As shown, a plurality of injectors 12 mounted on the walls and the ceiling of a weapons bay replace the single injector 12 of the preferred embodiment. In this alternative embodiment, the injectors 12 are oriented to expel the high pressure gas tangentially with respect to the walls of the weapons bay. As shown, the effect is to again actively enhance weapons separation while producing the desirable recirculating flow within the flowfield F.

Alternatively, for weapons bays having multiple rows of small weapons, an injector 12 can be placed in the weapons bay ahead of the nose of each weapon. The apparatus 10 is correspondingly modified to include a control valve 20 for each injector 12. Each control valve would then be selectively operated for the separation of the associated weapon. This insures the same, desirable weapons separation characteristic for each weapon.

Figure 8:
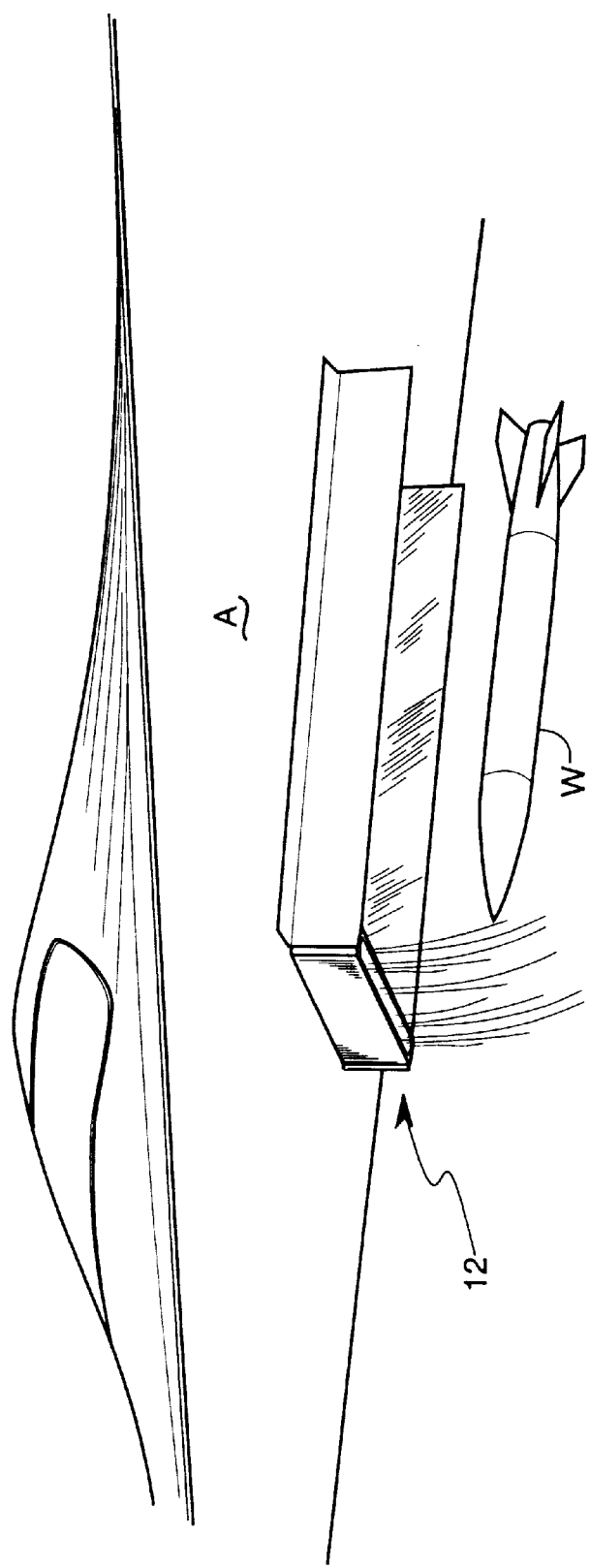

In yet another alternative, the apparatus 10 and method of the present invention can be incorporated in aircraft that deploy spoilers to enhance weapon separation. As is known in the art, spoilers are normally stowed within the weapons bay and are extended into the airstream when the bay doors are opened. As is also known, while spoilers such as these have a positive effect on weapons separation, they sometimes don't provide enough of the desirable nose down pitching moment for some weapon and aircraft combinations. Advantageously, the apparatus 10 and method of the present invention can be readily used in combination with spoilers to augment the effect of the spoiler, thereby overcoming the disadvantages of using spoilers alone. Further, the nozzle 12 can actually replace the spoiler. See FIG. 8 wherein this embodiment is illustrated. The nozzle 12 can be readily attached to the mechanism within the aircraft for extending the spoiler into the airstream when the bay doors are opened, as shown. This presents a significant avenue of improvement in weapons separation and yet, is readily incorporated into existing aircraft.

In summary, numerous benefits have been described which result from employing the concepts of the present invention. In particular, use of the apparatus 10 effectively enhances weapons release by the creation of a flowfield which urges a positive, even weapons separation.

The foregoing description of the preferred embodiment has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

We claim:

1. A method for actively enhancing the separation of weapons having a nose from an open bay of an aircraft while in flight, comprising the steps of:

provide an injector ahead of the nose of the weapon for introducing a flow of high pressure gas in a direction external to the aircraft and into the airstream of the aircraft in flight;

providing a source of high pressure gas in fluid communication with said injector;

controllably injecting a continuous flow of high pressure gas from said source externally from the aircraft, into the airstream; and, terminating the flow of high pressure gas after separation of the weapon.

2. The method of claim 1 wherein said controllably injecting step is preceded by the step of extending said injector into the airstream of the aircraft in flight.

3. The method of claim 1 wherein said source of high pressure gas includes a storage tank.

4. The method of claim 1 wherein said source of high pressure gas is a chemical reaction gas generator.

5. The method of claim 1 wherein said source of high pressure gas is a gas turbine engine compressor section bleed port.

6. The method of claim 1 wherein said source of high pressure gas is an air compressor.

7. An apparatus for actively enhancing the separation of weapons having a nose from an open bay of an aircraft while in flight, comprising:

at least one injector located ahead of the nose of the weapon; said injector having an outlet orifice oriented in a direction external to the aircraft;

a source of high pressure gas in fluid communication with said injector;

a control valve between said source and said injector for controllably directing a continuous flow of said high pressure gas through said injector away from the aircraft and into the airstream of the aircraft in flight during weapon separation.

8. The apparatus of claim 7 wherein said injector is a convergent nozzle shaped slot.

9. The apparatus of claim 7 wherein said injector is placed in front of the aircraft bay.

10. The apparatus of claim 7 wherein said injector is located in the bay of the aircraft and is extensible into the airstream of the aircraft in flight.

11. The apparatus of claim 7 wherein said source of high pressure gas is a chemical reaction gas generator.

12. The apparatus of claim 7 wherein said source of high pressure gas is a gas turbine engine compressor section bleed port.

13. The apparatus of claim 7 wherein said source of high pressure gas is an air compressor.

14. A method for actively enhancing the separation of weapons having a nose from an open bay of an aircraft while in flight, comprising the steps of:

provoking an injector ahead of the nose of the weapon for introducing a flow of high pressure gas into the airstream of the aircraft in flight;

providing a source of high pressure gas in fluid communication with said injector;

extending said injector into the airstream of the aircraft in flight;

controllably injecting a continuous flow of high pressure gas from said source into the airstream; and, terminating the flow of high pressure gas after separation of the weapon.

15. The method of claim 14 wherein said source of high pressure gas includes a storage tank.

16. The method of claim 14 wherein said source of high pressure gas is a chemical reaction gas generator.

17. The method of claim 14 wherein said source of high pressure gas is a gas turbine engine compressor section bleed port.

18. The method of claim 14 wherein said source of high pressure gas is an air compressor.

19. An apparatus for actively enhancing the separation of weapons having a nose from an open bay of an aircraft while in flight, comprising:

at least one injector located ahead of the nose of the weapon; said injector having an outlet orifice directed externally to the aircraft, said injector being located in the bay of the aircraft and extensible into the airstream of the aircraft in flight;

a source of high pressure gas in fluid communication with said injector;

a control valve between said source and said injector for controllably directing a continuous flow of said high pressure gas through said injector into the airstream of the aircraft in flight during weapon separation.

20. The apparatus of claim 19 wherein said injector is a convergent nozzle shaped slot.

21. The apparatus of claim 19 wherein said injector is placed in front of the aircraft bay.

22. The apparatus of claim 19 wherein said source of high pressure gas is a chemical reaction gas generator.

23. The apparatus of claim 19 wherein said source of high pressure gas is a gas turbine engine compressor section bleed port.

24. The apparatus of claim 19 wherein said source of high pressure gas is an air compressor.

* * * * *